United States Patent Office 3,823,148
Patented July 9, 1974

3,823,148
4-BIPHENYLYL ISOQUINOLINE DERIVATIVES
Alexander Bertus Arnold Jansen, 6 Linkwood Road, Burnham, England; John Hollowood, Saint Martin's Cottage, Highfield Lane, Nawton, England; and Alan Brian Wilson, 12 Chilterns Park, Bourne End, England
No Drawing. Filed May 25, 1972, Ser. No. 256,955
Claims priority, application Great Britain, June 3, 1971, 18,765/71
Int. Cl. C07d 35/28
U.S. Cl. 260—289 R       3 Claims

ABSTRACT OF THE DISCLOSURE

It has been found that new isoquinolines of the formula

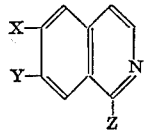

where X and Y are free or etherified hydroxy groups and Z is one of certain selected substituents and their di- and tetra-hydrogenated derivatives, and the acid addition salts thereof are pharmacologically active, for instance, on the cardiovascular system as hypotensives and on the central nervous system as depressants and anti-convulsants.

---

This invention relates to isoquinoline derivatives, to a process for the preparation thereof and to pharmaceutical compositions containing such derivatives.

Many isoquinoline derivatives in which the nitrogen ring is either aromatic or hydrogenated are known to have pharmaceutical activity (see for example Manske, Holmes, The Alkaloids, Vol. IV, p. 47–51). These derivatives comprise compounds of the general formula

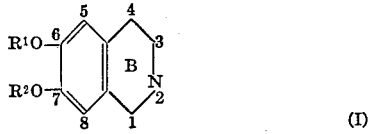

in which either ring B is aromatic or is tetrahydrogenated and $R^1$ and $R^2$ each is a hydrogen atom, a lower alkyl radical or a benzyl radical or $R^1$ and $R^2$ are connected together through a methylene group. The activity of the compounds appear to be affected largely by the substituent in the 1-position and many compounds having various 1-substituents have been prepared. The compounds may also be substituted in other positions, e.g. by lower alkyl, allyl or lower alkoxy radicals or halogen atoms.

Many dihydroisoquinoline derivatives are also known from the laterature and are generally used for the preparation of corresponding tetrahydroisoquinoline compounds by reduction or for the preparation of corresponding isoquinolines themselves by oxidation.

The present invention provides compounds of the general formula

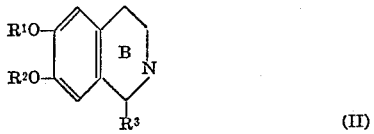

and acid addition salts thereof, in which ring B is aromatic, 3,4-dihydrogenated or 1,2,3,4-tetrahydrogenated, $R^1$ and $R^2$ are the same or different and each is a hydrogen atom, a lower alkyl radical or a benzyl radical or $R^1$ and $R^2$ together represent a methylene or ethylene radical, $R^3$ is a biphenylyl radical, an adamantyl radical, a sulphonamidophenyl radical, a diaminophenyl radical, a benzyl radical carrying an amino substituent on the benzene ring, or a radical of the formula

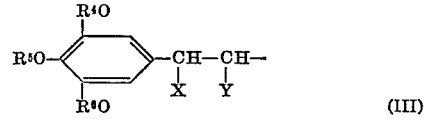

in which $R^4$, $R^5$ and $R^6$ are hydrogen atoms or lower alkyl radicals and X and Y are both hydrogen atoms or, when the ring B is aromatic or 3,4-dihydrogenated, X and Y together may complete a double bond.

The term "lower" as used herein means that the radical contains 1 to 6, preferably 1 to 4 carbon atoms. Furthermore, it is to be understood that other pharmaceutically acceptable radicals (e.g. lower alkyl particularly methyl, phenyl, methoxy or halogen) can be present in non-interfering positions of ring B or the aromatic ring of the compounds of general formula (II), as is known in the art. When ring B in the compounds of general formula (II) is not aromatic, optical isomers of these compounds are possible as there is an asymmetrical non-aromatic carbon atom present in the 1-position. The invention provides both of the optical isomers as well as the racemic form. The racemic form generally can be resolved into the optical isomers, if desired, using methods known in the art. For example, resolution can be effected by using D(−)quinic acid in methanol on the free base in aqueous ammonia and separating the solid, after which further ammonia can be added to the filtrate followed by dibenzoyl(+)tartaric acid in known manner.

The compounds of the above general formula are isoquinolines when ring B is aromatic, dihydroisoquinolines when the bond between positions 3 and 4 is saturated and tetrahydroisoquinolines when the bonds between positions 1 and 2 and 3 and 4 are saturated.

The compounds of formula II exhibited pharmacological activity on warm-blooded animals, particularly action on the cardiovascular system, for example, hypotensive activity, and action on the central nervous system, for example, as depressants and anti-convulsants. The new compounds may also be used as intermediates for the preparation of similar compounds.

The novel dihydroisoquinolines provided by the invention may be prepared following general methods known in the art. A very convenient method of preparation comprises cyclising an amide of the general formula

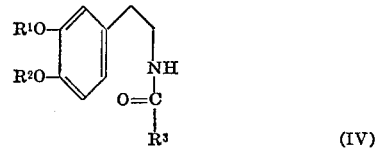

i.e. Bischler-Napieralski cyclisation. The cyclisation preferably is carried out in solution in an organic solvent in the presence of a dehydrating agent, for example phosphorus oxychloride. The amide of general formula (IV) can be prepared by reacting an amine of the formula

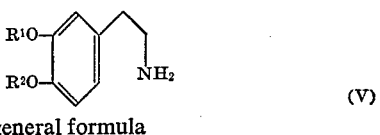

with an acid of the general formula $$R^3\text{—CO—OH} \qquad (VI)$$

or a functional derivative thereof, e.g. a halide, ester or amide. This acylation usually is carried out in solution in an organic solvent and preferably with about equimolar amounts of the two reactants. In general formulae (IV), (V) and (VI), $R^1$, $R^2$ and $R^3$ have the meanings defined above, with the proviso that $R^1$ and $R^2$ are not hydrogen. These latter compounds, i.e. dihydroisoquinolines containing hydroxyl groups in position 6- and 7- can be prepared from corresponding dihydroisoquinolines having protected groups convertible to hydroxyl group (e.g. ether groups) in those positions. Thus, for example, a 6,7-dimethoxyisoquinoline can be hydrolysed. Similarly, a reactive group (e.g. an amino group) in radical $R^3$ can be protected during the above reactions and the protective group removed later. Of course, if the amine of general formula (V) contains further inert substituent on the ethylene chain or in the aromatic ring, these substituents will appear in corresponding positions in the compound of formula (II) and in the dihydroisoquinoline of general formula (I).

Dihydroisoquinolines of the general formula (I) in which $R^3$ represents diaminophenyl or aminobenzyl may be obtained by reduction of the corresponding dihydroisoquinolines of the general formula (I) in which $R^3$ represents dinitrophenyl or dinitrobenzyl. This reduction may be carried out without hydrogenation of the 1,2-positions of ring by hydrogenation in the presence of a palladium/carbon catalyst until the required degree of hydrogenation has been reached.

The dhydroisoquinolines of general formula (I) may also be prepared by (a) reacting a metal halide complex of a cyano compound of the general formula $$R^3\text{—CN} \qquad (VII)$$

with a compound of the formula

(VIII)

where $R^1$, $R^2$ and $R^3$ have the meanings defined above, one of X and Y is hydrogen and the other is hydroxy which may be esterified with a carboxylic or sulphonic acid; or (b) reacting a cyano compound of the general formula $$R^3\text{—CN} \qquad (VII)$$

with a compound of the formula

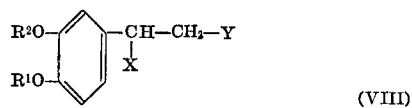

(IX)        (X)

in the presence of a cyclisation agent, where $R^1$, $R^2$ and $R^3$, X and Y have the meanings defined above. Lewis acids (e.g. zinc chloride) can be used as cyclisation agents.

The dihydroisoquinolines of general formula (II) can be prepared either as the free bases or as an acid addition salt. The salts can be formed by treatment of the base with an acid (e.g. hydrochloric acid) and the bases can be formed from the salts by neutralisation, e.g. with sodium carbonate.

Examples of radicals $R^1$ and $R^2$ are hydrogen, methyl, ethyl or benzyl or $R^1$ and $R^2$ together are methylene or ethylene. $R^3$ may, for example, be 2-biphenylyl, 4-biphenylyl, adamantyl, a sulphonamidophenyl radical (e.g. p-toluenesulphonamide phenyl, p-phenylsulphonamidophenyl or p-methylsulphonamidophenyl), a sulphonamidobenzyl radical (e.g. p-toluenesulphonamidobenzyl p-phenylsulphonamidobenzyl or p-methylsulphonamidobenzyl), 3,5-dinitrophenyl, 3,4,5-trimethoxystyryl or a β-(3,4,5-trimethoxyphenyl)ethyl radical. Furthermore, in general formula (II) there may, for example, be a methyl, methoxy, phenyl or bromine substituent on one of the rings, e.g. 3-(methyl or phenyl) or 8-(methoxy or bromo).

The compounds of general formula (I) in which $R^1$, $R^2$ and $R^3$ have the meanings defined above and ring B is aromatic or 1,2,3,4-tetrahydrogenated can be prepared by oxidation or reduction of the corresponding dihydroisoquinolines of the general formula

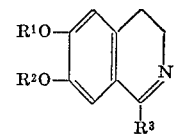

(XI)

The tetrahydroisoquinolines of general formula (I) in which $R^3$ has the definition given in formula (III) also can be prepared by reducing a 1-(3',4',5'-trihydroxy or trialkoxy)styryldihydroisoquinoline.

To prepare a tetrahydroisoquinoline, the dihydroisoquinoline or a salt thereof, is reduced with a suitable reducing agent. We have found that catalytic reduction, with hydrogen and a noble metal catalyst (e.g. $PtO_2$) of the starting material in solution in a solvent is very convenient. Alternatively an alkali metal borohydride, for example lithium borohydride may be used for the hydrogenation. Alkali metal borohydrides have the advantage that nitro groups in $R^3$ are not reduced. The reduction may be carried out at about room temperature (e.g. 10–30° C.). Atmospheric pressure or elevated pressures may be used.

To prepared an isoquinoline, the dihydroisoquinoline, which should be in the form of the free base for this reaction, can be oxidised with a mild oxidising agent capable of oxidising the hydrogen atoms in positions 3- and 4- of the ring without simultaneously causing the ring to break. We have found it very convenient to heat the dihydroisoquinoline, in solution in a solvent, with palladium carbon.

Depending on the reactants and conditions used, the product either is obtained as the free base or as an acid addition salt (e.g. the hydrochloride). Treatment of the base with a pharmaceutically acceptable acid will yield a salt. Similarly, neutralisation of an acid addition salt will yield the free base.

If it is desired to prepare an isoquinoline or tetrahydroisoquinoline of general formula (II) in which $R^1$ and $R^2$ are both hydrogen, the corresponding dihydroisoquinoline preferably is oxidised or reduced. However, it is also possible to obtain a 6,7-dihydroxyisoquinoline or tetrahydroisoquinoline by hydrolysing a corresponding 6,7-diether. For example a compound of general formula (II) can be prepared, in which $R^1$ and $R^2$ are alkyl groups, and subjected to hydrolysis.

In the above general formula (II), (IV) and (VI), $R^1$ and $R^2$ may, for example, be hydrogen, methyl, ethyl or benzyl, or together represent methylene or ethylene; and $R^3$ may, for example, be 4-biphenylyl, 2-biphenylyl, adamantyl, a lower alkylsulphonamidophenyl or -benzyl radical (e.g. 4-methylsulphonamidophenyl or 4-methylsulphonamidobenzyl), an arylsulphonamido-phenyl or -benzyl radical [e.g. 4-(p-tolylsulphonamido)-phenyl, 4-(p-tolylsulphonamido)benzyl, 4 - phenylsulphonamidophenyl or 4 - phenylsulphonamidobenzoyl], 2,4 - dinitrophenyl or 3,4,5-trimethoxyphenethyl.

The compounds of general formula (II) and their salts with pharmaceutically acceptable acids may be administered as pharmaceutical compositions. The present invention also provides a pharmaceutical composition comprising a compound of general formula (II), or an acid addition salt thereof, and a pharmaceutically acceptable carrier. The carrier can be solid, liquid or a mixture thereof and any suitable carrier known in the art may be used. The particular carrier used and dosage of compound will depend on the compound in question, the effect desired and standard pharmaceutical practice.

The following Examples illustrate the invention:

EXAMPLE 1

6,7-Dimethoxy-1-(4'-biphenylyl)-3,4-dihydroisoquinoline (a) 4-Biphenylcarboxylic acid chloride (0.08 mole), 2N sodium hydroxide (200 ml.) and homoveratrylamine (0.08 mole) were shaken together vigorously for 15 mins., during which time the reaction mixture became warm. This was allowed to cool, the solid was filtered off, washed well with water and recrystallised from ethanol to give 4 - phenyl-N-[β-(3',4'-dimethoxyphenyl)ethyl]benzamide of m.p. 174–175° C., yield 79%.

(b) 0.01 mole of this amide, phosphorus oxychloride (6 ml.) and toluene (10 ml.) were refluxed for 2 hours. The excess phosphorus oxychloride and toluene were removed and the residue washed with 20 ml. of 40–60° petroleum ether followed by 20 ml. of ether. The residue was taken up in hot water, the solution made alkaline with 40% sodium hydroxide and extracted into ether. The extract was dried (MgSO₄) and evaporated leaving the title compound which was recrystallised from aqueous ethanol, m.p. 137–138° C., yield 95%.

(c) The free base so prepared was dissolved in ether and ethereal hydrogen chloride was added. After recrystallising the product from ethanol/ether the hydrochloride sesquihydrate of the title compound was obtained in almost quantitative yield, m.p. 210–212° C.

EXAMPLE 2

6,7-Dihydroxy-1-(4'-biphenylyl)-3,4-dihydroisoquinoline

The product of Example 1(c) was heated with concentrated hydrochloric acid in a sealed tube for about 2 hrs. at 150° C. After cooling, the excess solvent was removed and the hydrochloride of the title compound separated out. It was recrystallised from methanol/ether. Yield 84%, m.p. 285–287° C.

EXAMPLE 3

1-Adamantyl-6,7-dimethoxy-3,4-dihydroisoquinoline (a) Adamantylcarboxylic acid chloride (0.01 mole) in chloroform (10 ml.) was added dropwise to a solution of homoveratrylamine (0.01 mole) in chloroform and the reaction was kept alkaline by the addition of 2N sodium hydroxide. The chloroform layer was washed with NaOH, Na₂CO₃ and water, and dried (MgSO₄). Removal of the solvent left a gum which gradually solidified. After recrystallising from aqueous ethanol N-[β-(3',4'-dimethoxyphenyl)ethyl]adamant-1-amide of m.p. 135–137° C. was obtained in 89% yield.

(b) The procedure of Example 1(b) followed by that of 1(c) was carried out but replacing the amide of that Example by the amide prepared above. The hydrochloride of the title compound was recrystallised from ethanol/ether, m.p. 242–244° C., yield 98%.

EXAMPLE 4

6,7-Dimethoxy-1-(2'-biphenylyl)-3,4-dihydroisoquinoline

The procedure of Example 1(a) was followed but replacing the 4-biphenylcarboxylic acid chloride of that Example by 2-biphenylcarboxylic acid. After recrystallising from ethanol, 2-phenyl-N-[β-(3',4'-dimethoxyphenyl)ethyl]benzamide of m.p. 129–130° C. was obtained in 56% yield. The procedure of Example 1(b) was then followed but replacing the amide of that example by the amide prepared above. After recrystallising from aqueous ethanol the title compound of m.p. 150–151° C. was obtained in 98% yield. This was converted to the hydrochloride by the method of Example 1(b) and the desired hydrochloride of m.p. 210–211° C. was recrystallised from ethanol/ether in 98% yield.

EXAMPLE 5

1-Adamantyl-6,7-dihydroxy-3,4-dihydroisoquinoline

The procedure of Example 2 was followed but replacing the isoquinoline used in that example by 1-adamantyl-6,7-dimethoxy-3,4-dihydroisoquinoline. After recrystallising from ethanol/ether the hydrochloride of the title compound of m.p. 265–267° C. was obtained in 58% yield.

EXAMPLE 6

6,7-Dimethoxy-1-(3',5'-dinitrophenyl)-3,4-dihydroisoquinoline (a) The procedure of Example 1(a) was repeated but replacing the 4-biphenylcarboxylic chloride by 2,4-dinitrobenzoic acid chloride. After recrystallising from ethanol N-[β-(3',4' - dimethoxyphenyl)ethyl] - 3,5 - dinitrobenzamide of m.p. 198–200° C. was obtained in 98% yield.

(b) This amide (0.01 ml.) phosphorus oxychloride (6 ml.) and toluene (10 ml.) were refluxed for 2 hours. The excess phosphorus oxychloride and toluene were removed and the residue was triturated with ether until it solidified. The solid was purified by boiling an ethanol solution with charcoal and allowing the crystallisation to take place. The title compound in the form of the hydrochloride of m.p. 199–200° C. was recrystallised from ethanol in 87% yield.

EXAMPLE 7

6,7-Dimethoxy-1-(3',4',5'-trimethoxystyryl)-3,4-dihydroisoquinoline (a) 3,4,5-trimethoxycinnamic acid (0.01 mole) and homoveratrylamine (0.01 mole) were heated together in an oil bath at 180–190° C. for 1 hour, allowed to cool and the residue was taken up in hot benzene. The solution was washed with 2-N-hydrochloric acid, 2N-sodium carbonate and water and dried (MgSO₄). Removal of the solvent left a viscous oil which crystallised on standing. After recrystallisation from aqueous ethanol 3,4,5-trimethoxycinnam-N-[β-(3',4' - dimethoxyphenyl)ethyl]amide of m.p. 118–119° C. was obtained on 50% yield.

(b) The procedure of Example 6(b) was then followed but replacing the amide used in that Example by the amide prepared above. After recrystallising from ethanol/ether, the title compound in the form of the hydrochloride was obtained in 89% yield, m.p. 163–165° C.

EXAMPLE 8

1-[4'-(p-toluenesulphonamido)phenyl]-6,7-dimethoxy-3,4-dihydroisoquinoline (a) A mixture of homoveratrylamine (0.01 mole) and 4-(p-toluenesulphonamido)benzoic acid chloride (0.01 mole) was refluxed in anhydrous pyridine for 12 hours, cooled and poured into excess of 2N hydrochloric acid. A gum was formed which solidified overnight in the refrigerator. This was filtered off and taken up in chloroform, filtered and the filtrate washed with 2N sodium carbonate and water and dried. Removal of the solvent left a solid which, after recrystallisation from ethanol, yielded 4-(p-toluenesulphonamido) - N - [β-(3',4'-dimethoxyphenyl)ethyl]benzamide of m.p. 186° C. Yield 44%.

(b) The procedure of Example 1(b) was then followed using this amide instead of the amide of Example 1(b) with the additional difference that instead of making the solution alkaline with 40% sodium hydroxide, 2N sodium carbonate was used to take the pH to 7. The title compound of m.p. 199–202° C. was obtained in 31% yield.

This was converted to the monohydrate hydrochloride of m.p. 182–3° C.

EXAMPLE 9

1-(4'-methylsulphonamido)benzyl-6,7-dimethoxy-3,4-dihydroisoquinoline

The procedure of Example 7(a) was followed but replacing the acid used in that Example by 4-(methylsulphonamido)phenylacetic acid. After recrystallising from ethanol 4-(methylsulphonamido)-N-[β-(3',4'-dimethoxyphenyl)ethyl]phenylacetamide of m.p. 171–3° C. was obtained in 89% yield.

The procedure of Example 8(b) was then followed but replacing the amide of that example with the amide prepared above to obtain the title compound in 62% yield, m.p. 198–200° C. The title compound was converted to its monohydrate hydrochloride of m.p. 180–182° C.

EXAMPLE 10

1-(4'-methylsulphonamido)benzyl-6,7-methylenedioxy-3,4-dihydroisoquinoline (a) 4 - (Methylsulphonamido)phenylacetic acid (0.01 mole) and β-(3,4-methylenedioxyphenyl)ethylamine (0.01 mole) were heated together in an oil bath at 180–190° C. for about 1 hour. After following the working up procedure of Example 7(a), 4-(methylsulphonamido)-N-[β-(3,4-methylenedioxyphenyl)ethyl]phenylacetamide of m.p. 154–6° C. was obtained in 84% yield.

(b) The procedure of Example 6(b) was then followed but replacing the amide of that Example by the amide prepared above. After recrystallisation from ethanol the title compound in the form of the hydrochloride was obtained in 71% yield, m.p. 223–226° C.

EXAMPLE 11

1-(4'-phenylsulphonamido)benzyl-6,7-dimethoxy-3,4-dihydroisoquinoline

The procedure of Example 7(a) was repeated but replacing the acid by 4-(phenylsulphonamido)phenylacetic acid. After recrystallising from ethanol, 4-(phenylsulphonamido) - N - [β-(3',4'-dimethoxyphenyl)ethyl]phenylacetamide of m.p. 153° C. was obtained in 80% yield.

The procedure of Example 6(b) was then followed but replacing the amide of that example by the amide of that above. After recrystallising from ethanol the hydrochloride monohydrate of the title compound was obtained in 71% yield, m.p. 145–155° C.

EXAMPLE 12

1-(4'-phenylsulphonamido)benzyl-6,7-methylenedioxy-3,4-dihydroisoquinoline

The procedure of Example 10(a) was followed but replacing the acid used by 4-(phenylsulphonamido)phenylacetic acid to obtain 4-(phenylsulphonamido)-N-[β-(3',4'-methylenedioxyphenyl)ethyl]phenylacetamide in 80% yield, m.p. 180° C.

The procedure of Example 6(b) was then followed but replacing the amide by the amide of this example. After recrystallisation from ethanol the title compound was obtained as the hydrochloride monohydrate in 57% yield, m.p. 250–255° C.

EXAMPLE 13

1-[4'-(p-Toluenesulphonamido)benzyl]-6,7-dimethoxy-3,4-dihydroisoquinoline

The procedure of Example 7(a) was followed but replacing the acid used in that example by 4-(p-toluenesulphonamido)phenylacetic acid in order to obtain 4-(p-toluenesulphonamido) - N - [β-(3',4'-dimethoxyphenyl) ethyl]phenylacetamide.

The procedure of Example 6(b) was then followed using this amide in order to obtain the title compound as the hydrochloride in 67% yield, m.p. about 150° C.

EXAMPLE 14

1-[4'-(phenylsulphonamido)benzyl-3-methyl-6,7-methylenedioxy-3,4-dihydroisoquinoline (a) The procedure of Example 12(a) was employed except in that β-(3,4-methylenedioxyphenyl)isopropylamine was used nstead of β-(3,4-methylenedioxyphenyl)ethylamine.

(b) The procedure of Example 12(b) was then followed but replacing the amide of that example by the amide of this example. After recrystallisation from ethanol the title compound was obtained as the hydrochloride monohydrate of m.p. 233–235° C.

EXAMPLE 15

1-[4'-(p-Toluenesulphonamido)benzyl]-6,7-methylenedioxy-3,4-dihydroisoquinoline

The procedure of Example 10(a) was followed but replacing the acid used by 4-(p-toluenesulphonamido)phenylacetic acid to obtain 4-(p-toluenesulphonamido)-N-[β-(3',4' - methylenedioxyphenyl)ethyl]phenylacetamide in 74% yield, m.p. 135–137° C.

This amide was reacted with phosphorus oxychloride in order to obtain the title compound.

EXAMPLE 16

By replacing the amine, used to prepare the intermediate amide, by other suitable amines, dihydroisoquinolines containing other substituents in the aromatic and hydrogenated rings can be prepared following the information given herein. For example:

(a) β-(4-ethoxy-3-methoxyphenyl)ethylamine,
(b) β-(4-benzyloxy-3-methoxyphenyl)ethylamine,
(c) β-(3,4-diethoxyphenyl)ethylamine,
(d) β-(3,4-ethylenedioxyphenyl)ethylamine,
(e) β-(3,4-methylenedioxyphenyl) - α - phenyl ethylamine,
(f) β-(3,4,5-trimethoxyphenyl)ethylamine, or
(g) β-(5 - bromo-3,4-dimethoxyphenyl)ethylamine will yield respectively a (a) 7-ethoxy-6-methoxy-3,4-dihydroisoquinoline,
(b) 7-benzyloxy-6-methoxy-3,4-dihydroisoquinoline,
(c) 6,7-diethoxy-3,4-dihydroisoquinoline,
(d) 6,7-ethylenedioxy-3,4-dihydroisoquinoline,
(e) 6,7 - methylenedioxy-3-phenyl-3,4-dihydroisoquinoline,
(f) 6,7,8-trimethoxy-3,4-dihydroisoquinoline, or
(g) 8-bromo-6,7-dimethoxyphenyl-3,4-dihydroisoquinoline, each of which will be substituted by an appropriate radical $R^3$ in the 1-position.

EXAMPLE 17

1-(3,5-Diaminophenyl)-3,4-dihydro-6,7-dimethoxyisoquinoline 1-(3,5-dinitrophenyl) - 3,4 - dihydro-6,7-dimethoxyisoquinoline hydrochloride (13.1 grams) in glacial acetic acid (250 ml.) was hydrogenated over 6 grams of 5% Pd/C catalyst at room temperature and pressure until uptake of hydrogen was complete. The solution was filtered and the solvent removed by evaporation. The residue was recrystallised from a methanol/ether mixture to give the title compound in the form of its hydrochloride (9.18 grams) of m.p. 199–200° C.

EXAMPLE 18

1-(p-Aminobenzyl)-3,4-dihydro-6,7-dimethoxyisoquinoline

The procedure of Example 17 was repeated using 1-(p-nitrobenzyl)-3,4-dihydro-6,7-dimethoxyisoquinoline as the nitro-compound. The hydrochloride of the title compound was recrystallised from ethanol m.p. 187–189° C.

EXAMPLE 19

1-p-Acetamidobenzyl-6,7-dimethoxy-3,4-dihydroisoquinoline

The corresponding aminodihydroisoquinoline dihydrochloride (2 grams) was heated with acetic anhydride (5 ml.) on a steam bath for 10 minutes. The residual gum obtained by evaporation of the resulting solution was triturated with ether. The resulting solid (1.75 g.) after crystallisation from methanol had m.p. 219–221° C.

EXAMPLE 20

6,7-Dihydroxy-1-(4'-biphenylyl)-1,2,3,4-tetrahydroisoquinoline 6,7 - Dimethoxy-1-(4'-biphenylyl)-3,4-dihydroisoquinoline hydrochloride (1.9 g., 0.005 mole) in aqueous ethanol (50 ml.) ethanol and 10 ml. water) was hydrogenated over Adams catalyst (0.2 g.) at room temperature and atmospheric pressure for about 3 hours until no further uptake of hydrogen occurred. The catalyst was filtered off and the solvent removed to give the title compound as the hydrochloride. This was recrystallised from ethanol/ether in 98% yields, m.p. 260-261° C.

EXAMPLE 21

6,7-Dimethoxy-1-(4'-biphenylyl)-1,2,3,4-tetrahydroisoquinoline

The procedure of Example 20 was repeated replacing the dihydroisoquinoline by the corresponding 6,7-dihydroxy compound to obtain the title compound as the hydrochloride in 72% yield after crystallisation from ethanol/ether, m.p. 187-190° C.

EXAMPLE 22

1-Adamantyl-6,7-dimethoxy-1,2,3,4-tetrahydroisoquinoline

The procedure of Example 20 was repeated but using 1-adamantyl-6,7-dimethoxy - 3,4 - dihydroisoquinoline hydrochloride to obtain the title compound as the hydrochloride in 93% yield after recrystallisation from ethanol, m.p. 287-288° C.

EXAMPLE 23

1-Adamantyl-6,7-dihydroxy-1,2,3,4-tetrahydroisoquinoline

The procedure of Example 22 was repeated but using the corresponding 6,7-dihydroxy compound to obtain the title compound as the hydrochloride after crystallisation from ethanol/ether, m.p. 268-270° C.

EXAMPLE 24

6,7-Dimethoxy-1-(3',4',5'-trimethoxyphenethyl)-1,2,3,4-tetrahydroisoquinoline

The procedure of Example 20 was repeated but replacing the dihydroisoquinoline by 6,7-dimethoxy-1-(3',4',5'-trimethoxystyryl)-3,4 - dihydroisoquinoline hydrochloride monohydrate to obtain the title compound as the hydrochloride in 97% yield after recrystallisation from ethanol/ether, m.p. 173-175° C.

EXAMPLE 25

6,7-Dimethoxy-1-(4'-biphenylyl)isoquinoline 6,7-Dimethoxy-1-(4' - biphenylyl) - 3,4 - dihydroisoquinoline (0.01 mole) and 2 g. of 10% palladium/carbon were refluxed in decahydronaphthalene (100 ml.) for 4 hours under nitrogen. The hot solution was filtered and extracted into 2N hydrochloric acid. Then the solution was made alkaline with 40% sodium hydroxide and extracted into chloroform. After drying the extract (MgSO$_4$) and evaporating, the title compound was left as a solid which we recrystallised from ethanol in 50% yield, m.p. 173-174° C.

The hydrochloride dihydrate of the title compound was made in approximately quantitative yield by adding ethereal hydrogen chloride to a solution of the free base in ether and recrystallising from ethanol/ether, m.p. 204-206° C.

EXAMPLE 26

6,7-Dihydroxy-1-(4'-biphenylyl)isoquinoline 6,7-Dihydroxy - 1 - (4'-biphenylyl)-3,4 - dihydroisoquinoline (1.5 grams) and concentrated hydrochloric acid (25 ml.) were heated together at 150° C. in a sealed tube for 2 hours. After cooling and removing the solvent on a rotary evaporator and recrystallising the resulting solid from ethanol/ether the hydrochloride monohydrate of the title compound m.p. 245-247° C. was obtained in 50% yield.

EXAMPLE 27

1-Adamantyl-6,7-dimethoxyisoquinoline

The procedure of Example 25 was followed but replacing the dihydroisoquinoline by 1-adamantyl-6,7-dimethoxy-3,4-dihydroisoquinoline to obtain the title compound of m.p. 197-199° C. in 89% yield after recrystallisation from 60/80 petroleum ether. This was converted to the hydrochloride monohydrate of m.p. 210-211° C. after recrystallisation from ethanol/ether.

EXAMPLE 28

1-Adamatyl-6,7-dihydroxyisoquinoline

The procedure of Example 26 was followed but replacing the isoquinoline by the corresponding 1-adamantyl compound. The hydrochloride monethanolate of the title compound of m.p. 195-197° C. was obtained in 94% yield.

EXAMPLE 29

1-[4'-(methylsulphonamido)benzyl]-6,7-dimethoxyisoquinoline

1-[4-(methylsulphonylamido)benzyl] - 6,7-dimethoxy-3,4-dihydroisoquinoline (0.01 mole) and 2 g. of 10% palladium/carbon were refluxed in decahydronaphthalene (100 ml.) for 4 hours under nitrogen. The hot solution was filtered and the precipitate extracted with hot chloroform. The extract was evaporated to leave the title compound which was recrystallised from ethanol in 65% yield, m.p. 197-200° C. This could be converted to the hydrochloride by treating a solution of the free base in chloroform with ethereal hydrogen chloride.

EXAMPLE 30

1-(3,5-Dinitrophenyl)-6,7-dimethoxyisoquinoline

This compound was prepared from the 3,4-dihydro derivative in a manner analogous to Examples 25-30, the hydrochloride of the title compound being recrystallised from methanol/ether. The hydrochloride had a m.p. of 217-218° C.

EXAMPLE 31

1-(p-Aminobenzyl)-6,7-dimethoxyisoquinoline 1-(p-Nitrobenzyl) - 6,7 - dimethoxyisoquinoline (6.2 grams) in 70% acetic acid (200 ml.) was hydrogenated at room temperature and pressure over 3 grams of 5% palladium/carbon; the reaction was complete after 1 hour. The residue from evaporation of the filtered solution was crystallised from ethanol in a yield of 5.7 grams, m.p. of the hydrochloride 219-220° C.

EXAMPLE 32

Further isoquinolines and tetrahydroisoquinolines can be prepared following the procedure given in Examples 20 to 31 using other starting materials. In particular further dihydroquinolines described in Examples 1 to 19 may be used.

What is claimed is:
1. A compound selected from the group consisting of bases having the formula

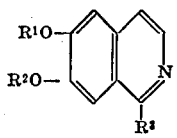

wherein R$^1$ and R$^2$ are each members of the group consisting of hydrogen and lower alkyl, and R$^3$ is a biphenylyl radical, and the salts of said bases with pharmaceutically acceptable acids.

2. The compound defined in Claim 1 which is 6,7-dimethoxy-1-(4'-biphenylyl)isoquinoline.

3. The compound defined in Claim 1 which is 6,7-dihydroxy-1-(4'-biphenylyl)isoquinoline.

References Cited

UNITED STATES PATENTS

| | | | |
|---|---|---|---|
| 3,131,191 | 4/1964 | Douglas | 260—285 |
| 3,146,266 | 8/1964 | Besendorf | 260—289 R |
| 3,217,007 | 11/1965 | Brossi | 260—289 R |
| 3,474,104 | 10/1969 | Ott | 260—289 R |
| 3,497,516 | 2/1970 | Mashimo | 260—289 R |
| 1,941,647 | 2/1934 | Wolfes | 260—289 R |
| 2,223,373 | 12/1940 | Kulz et al. | 260—289 R |
| 2,951,013 | 8/1960 | Dengel | 260—288 R |
| 3,435,838 | 3/1969 | Hardtmann | 260—288 R |
| 3,438,989 | 4/1969 | Shavel | 260—289 R |
| 3,517,015 | 6/1970 | Ott | 260—288 R |
| 3,574,215 | 4/1971 | Lindenmann | 260—288 R |
| 3,717,639 | 2/1973 | Neumeyer | 260—289 R |

OTHER REFERENCES

Mndzhoyan et al., Chem. Abstr., Vol. 74, Col. 53476u (1971).

Markwardt et al., Chem. Abstr. Vol. 73, Col. 98822z (1970).

Markwardt et al., Chem. Abstr. Vol. 73, Col. 14719 R (1970).

Brossi et al,. Chem. Abstr., Vol. 71, Col. 39233u (1969).

DONALD G. DAUS, Primary Examiner

U.S. Cl. X.R.

260—240 D, 283 SA, 283 SY, 287 R, 288 R, 340.9, 556 AR, 558 R